US012761061B2

(12) United States Patent
Hügler et al.

(10) Patent No.: US 12,761,061 B2
(45) Date of Patent: Oct. 13, 2026

(54) FILL-LEVEL METER

(71) Applicant: Endress+Hauser SE+Co. KG, Maulburg (DE)

(72) Inventors: Philipp Hügler, Aalen (DE); Winfried Mayer, Buch (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 232 days.

(21) Appl. No.: 18/714,786

(22) PCT Filed: Nov. 21, 2022

(86) PCT No.: PCT/EP2022/082662
§ 371 (c)(1),
(2) Date: May 30, 2024

(87) PCT Pub. No.: WO2023/104492
PCT Pub. Date: Jun. 15, 2023

(65) Prior Publication Data

US 2025/0155271 A1 May 15, 2025

(30) Foreign Application Priority Data

Dec. 9, 2021 (DE) ..................... 10 2021 132 553.6

(51) Int. Cl.
*G01F 23/284* (2006.01)
*G01S 13/88* (2006.01)
(Continued)

(52) U.S. Cl.
CPC ............ *G01F 23/284* (2013.01); *G01S 13/88* (2013.01); *H01Q 1/225* (2013.01); *H01Q 19/06* (2013.01)

(58) Field of Classification Search
CPC ....... G01F 23/284; G01S 13/88; H01Q 1/225; H01Q 19/06
See application file for complete search history.

(56) References Cited

U.S. PATENT DOCUMENTS 6,097,346 A * 8/2000 Fehrenbach ........... H01Q 13/24 343/715
2002/0059828 A1 * 5/2002 Muller .................... G01S 15/88 73/290 R
(Continued)

FOREIGN PATENT DOCUMENTS

DE 10393855 T5 2/2006
DE 112005002578 B4 10/2013
(Continued)

*Primary Examiner* — Nazra Nur Waheed
(74) *Attorney, Agent, or Firm* — Mark A. Logan; Endress+Hauser (USA) Holding, Inc.

(57) ABSTRACT

A radar based, fill level measuring device for measuring fill levels in containers via small, lateral openings of the containers comprises a tubular antenna arrangement with a tube axis suitable for the container opening. In a tube end region protruding out into the container, a radar-bundling means is arranged, which is oriented perpendicular to the fill substance. Arranged in the tube interior of the antenna arrangement in the focal point of the radar-bundling means is a primary radiator connected with the transmitting/receiving electronics and, via the radar-bundling means, transmits the radar signal to the fill substance and receives the reflection from the fill substance. The compactness of the antenna arrangement required for the container opening is achieved in that the radar-bundling means and the primary radiator each have an asymmetric aperture which is larger in parallel with tube axis than orthogonally to the tube axis.

10 Claims, 2 Drawing Sheets

(51) Int. Cl.
*H01Q 1/22* (2006.01)
*H01Q 19/06* (2006.01)

(56) References Cited

U.S. PATENT DOCUMENTS

| | | | | |
|---|---|---|---|---|
| 2018/0372531 | A1* | 12/2018 | Waelde | H01Q 21/064 |
| 2020/0003592 | A1* | 1/2020 | Sulzer | G01F 1/584 |
| 2022/0291331 | A1* | 9/2022 | Dieterle | G01F 23/284 |
| 2023/0098780 | A1* | 3/2023 | Welle | G01F 23/00 73/301 |
| 2023/0223704 | A1* | 7/2023 | Waelde | H01Q 1/225 343/702 |

FOREIGN PATENT DOCUMENTS

| | | | |
|---|---|---|---|
| DE | 10 2012 104 858 | A1 | 12/2013 |
| DE | 102012109101 | A1 | 3/2014 |
| DE | 102013106978 | A1 | 1/2015 |
| DE | 10 2013 108 490 | A1 | 2/2015 |
| DE | 102019104682 | A1 | 8/2020 |
| DE | 102020106020 | A1 | 9/2021 |

* cited by examiner

FILL-LEVEL METER

CROSS-REFERENCE TO RELATED APPLICATIONS

The present application is related to and claims the priority benefit of DPMA Patent Application No. 10 2021 132 553.6, filed on Dec. 9, 2021, and International Patent Application No. PCT/EP2022/082662, filed Nov. 21, 2022, the entire contents of which are incorporated herein by reference.

TECHNICAL FIELD

The invention relates to a fill level measuring device, or meter, which can be used at small, lateral openings of the containers.

BACKGROUND

In automation technology, especially for process automation, field devices are often applied, which serve for registering diverse measured variables. The measured variable to be determined can be, for example, a fill level, a flow, a pressure, the temperature, the pH value, the redox potential, a conductivity or the dielectric value of a medium in a process plant. For registering the corresponding measured values, the field devices comprise suitable sensors based on suitable measuring principles. A large number of different field device types are manufactured and sold by the Endress+Hauser group of companies.

For fill level measurement of fill substances in containers, radar based measuring methods have proven themselves, since they are robust and are distinguished by low-maintenance. A central advantage of radar based measuring methods is their ability to measure fill level virtually continuously. In the context of the invention, the terminology "radar" refers to radar signals with frequencies between 0.03 GHz and 300 GHz. Usual frequency bands, at which fill level measurement is performed, lie at 2 GHZ, 26 GHZ, 79 GHz, and 120 GHz. Two established measuring principles, in such case, are the pulse travel time principle (also known as "pulse radar") and the FMCW principle ("Frequency Modulated Continuous Wave"). A fill level measuring device working according to the pulse travel time method is described, for example, in disclosure document DE 10 2012 104 858 A1. A typical construction of FMCW based fill level measuring devices is presented, by way of example, in disclosure document DE 10 2013 108 490 A1. The FMCW and pulse radar measuring principles are described in greater detail in "*Radar Level Detection*, Peter Devine, 2000".

Since radar based, fill level measuring devices determine fill level indirectly, in that they measure from above the fill substance surface, fill level measuring devices according to the state of the art are so designed that they are mounted on the top of the container. For this, the containers need a corresponding connection means, such as a flange connection, on top. Often, such connections need to be supplied by retrofitting, while, in contrast, lateral connections are often present per se on containers, for example, as unused inlets or outlets, or as connections for pressure- or temperature measurement. A lateral installation on a container wall can bring the danger that the container wall is struck by the main radiation lobe of the transmitted radar signal, whereby disturbance reflections can arise, which lead to an incorrect fill level measurement.

DE10 2020 106 020 A1 describes a radar based, fill level measuring device, which is mounted laterally on the container, wherein its antenna arrangement extends from there inwardly into the container in the form of a hollow tube. In such case, the antenna arrangement is designed to transmit the radar signal vertically downwards with an asymmetric bundling. In this way, the possibility of a reflection on the container wall is lessened. In the case of the fill level measuring device shown there, the asymmetric bundling is implemented via a corresponding aperture. In such case, the cross section of the hollow tube, in whose end region the asymmetric aperture is arranged, needs to have a sufficiently large cross section of especially greater than DN50. For, in order for the transmitted radar signal to have a sufficient bundling, thus a sufficient asymmetry, the aperture needs to be dimensioned correspondingly large.

Depending on process plant, however, lateral openings of containers are often only available with small diameter of significantly less than DN50.

SUMMARY

An object of the invention, therefore, is to provide a fill level measuring device, by means of which the fill level can be determined via a small, lateral opening of the container.

The invention achieves this object by a radar based, fill level measuring device for measuring a fill level of a fill substance in a container, comprising:

- a securement means, by means of which the fill level measuring device is securable at a lateral opening of the container,
- a transmitting/receiving unit, which is designed to produce the radar signal and after reflection on the fill substance surface to ascertain fill level based on corresponding received signals,
- a tubular antenna arrangement having a defined tube axis, wherein the tubular antenna arrangement can be led through the container opening, and wherein the tubular antenna arrangement has
  - an end region, which in the secured state protrudes out into the container,
  - a radar-bundling means arranged in the end region and oriented in the secured state perpendicularly to the fill substance, and
  - a primary radiator connected with the transmitting/receiving unit and arranged in the tube interior in the focal point of the radar-bundling means, in order to transmit the radar signal to the fill substance and to receive its reflection.

According to the invention, the fill level measuring device is distinguished by features that both the radar-bundling means as well as also the primary radiator have, in each case, an asymmetric aperture, which is larger in parallel with the tube axis than orthogonal to the tube axis. Optimally in this connection, the ratio of the asymmetry is set, for example at 3:1, equally for the aperture of the primary radiator and the aperture the radar-bundling means. In this way, there results, in total, that the radar signal is transmitted with a main radiation lobe flattened toward the container wall. This acts, thus, advantageously, in that the antenna arrangement does not need to extend far into the container and the radar signal, in spite of this, is not undesirably reflected on the container-wall. Because the radar-bundling means and the primary radiator are symmetrically designed, the antenna arrangement is so compactly designable that it works also in the case of container openings with diameter smaller than DN50. Nevertheless, in total, an aperture is implementable, which is sufficiently large and asymmetrical. In this connection, sufficient asymmetry is present, when the aperture of the radar-bundling means, and of the primary radiator is larger in parallel with tube axis than orthogonally to the tube axis at least by a factor of 1.5, especially a factor 3. For maximizing the transmitting power, it is additionally advantageous that the radar-bundling means and the primary radiator are adapted to one another in such a manner that the primary radiator illuminates the outer contour of the radar-bundling means with the radar signal with −10 dB with respect to the main radiation axis of the directional characteristic.

Also the choice of the frequency band, in which the radar signal is produced, influences the minimum size of the antenna arrangement, since the radar signal at given aperture is better bundled, or focused, with rising frequency. Accordingly, the transmitting/receiving unit is advantageously designed to produce the radar signal with a frequency of at least 60 GHz, especially at least 120 GHZ.

The radar-bundling means can, for example, be designed lens shaped and be made of a radar-focusing plastic, such as PE, PEEK or PTFE. According to the invention, the design of the radar-bundling means, as well as also the design of the primary radiator, are, however, not fixedly predetermined, as long as an appropriately asymmetric bundling results. The primary radiator can, accordingly, be designed, for example, as patch antenna, or antenna array, as electrically conductive coupling-pin, or as slit-hollow conductor antenna. In such case, the primary radiator can be an integral component of the transmitting/receiving unit, such that both are arranged in the antenna arrangement in the focal point of the radar-bundling means. In this way, conduction losses between the transmitting/receiving unit and the primary radiator are minimized. However, the implementing of explosion protection requirements is made difficult in the case of this design, because the transmitting/receiving unit as active, i.e. electrical current containing, component is located in the antenna arrangement and, thus, in the container interior. In order to avoid this, the transmitting/receiving unit can be arranged in a special housing of the fill level measuring device, which in the secured state is located outside of the container. In such case, the primary radiator for transmitting the radar signal is connected with the transmitting/receiving unit, for example, via a waveguide, especially a hollow conductor, a dielectric waveguide, a microstrip conductor or a coaxial cable.

In connection with the transmitting/receiving unit, the terminology "unit" in the context of the invention means, in principle, any electronic circuit, which is suitably designed for the contemplated application. It can, thus, depending on requirement, refer to an analog circuit for producing, or processing, corresponding analog signals. It can also be a digital circuit, such as an FPGA or a storage medium in cooperation with a program. In such case, the program is designed to perform the corresponding method steps, thus to apply the required computer operations of the particular unit. In this context, various electronic units of the dielectric value measuring device can, within the scope of the invention, potentially also use a shared physical memory, or be operated by means of the same physical, digital circuit.

BRIEF DESCRIPTION OF THE DRAWINGS

The present disclosure will now be explained in greater detail based on the appended drawing. The figures of the drawing show as follows.

DETAILED DESCRIPTION

Figure 1:
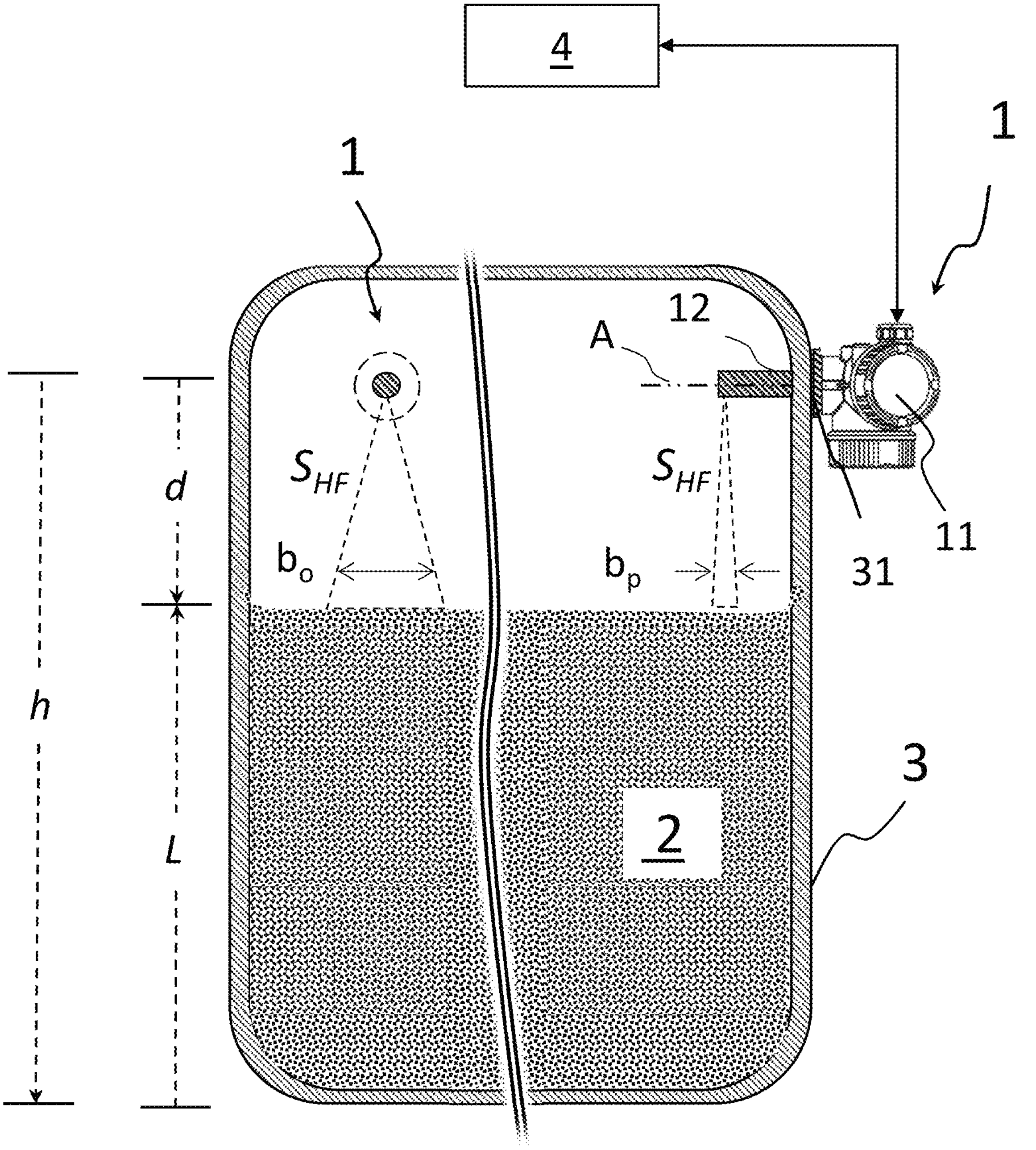
FIG. 1 shows a radar based, fill level measuring device of the invention at a lateral opening of the container.

For understanding the invention, FIG. 1 shows a freely radiating, radar based, fill level measuring device 1 arranged at a lateral opening 31 of a container 3. In such case, a fill substance 2 is located in the container 3, a fill substance 2 such as, for example, a fuel, whose fill level L is to be determined by the fill level measuring device 1.

As a rule, the fill level measuring device 1 is connected via a bus system, such as, for instance, "Ethernet", "PROFIBUS", "HART" or "wireless HART", with a superordinated unit 4, for example, a process control system or a decentral database. In this way, on the one hand, information concerning the operating state of the fill level measuring device 1 can be communicated. However, also information concerning the fill level L can be transmitted via the bus system, in order, in given cases, to control in- or outgoing flows of the container 3.

In order to be able reliably to ascertain the fill level L, the fill level measuring device 1 needs in the case of lateral arrangement to be arranged at a container opening 31, which is located above the maximum fill level L of the fill substance 2. In such case, the installed height h above the floor of the container 3 is known and furnished in the fill level measuring device 1. Additionally, the fill level measuring device 1 is secured and oriented in such a manner pressure- and media-tightly at the container opening 31 that only the tubular antenna arrangement 12 of the fill level measuring device 1 extends horizontally into the container 3, while the additional components of the fill level measuring device 1 are arranged outside of the container 3. For installation of the fill level measuring device 1, the tube-shape of the antenna arrangement 12 does need, moreover, to be sufficiently compactly designed that during mounting of the fill level measuring device 1 it can be led through the container opening 31. In such case, depending on process application, there can be available laterally only a very small container opening, for example, having a diameter of DN20. After lead through of the antenna arrangement 12, the fill level measuring device 1 can be secured to the lateral opening of the container 31 by means of a suitable securement means, such as a flange connection.

The antenna arrangement 12 is so designed that via its end region 121 protruding out into the container, radar signals $S_{HF}$ within a predefined frequency band are transmitted in the direction of the surface of the fill substance 2. After reflection on the fill substance surface, the fill level measuring device 1 receives the reflected received signals, in turn, via this end region 121. In such case, the signal travel time t between transmitting and receiving the radar signal $S_{HF}$ is, according to $$t = \frac{2 * d}{c},$$

proportional to the distance d between the fill level measuring device 1 and the fill substance 2, wherein c corresponds to the radar-propagation velocity of the appropriate speed of light. The signal travel time t can be determined by the fill level measuring device 1, for example, by means of the FMCW method or by means of the pulse travel time method. In this way, the fill level measuring device 1 can associate the measured travel time t with distance d, for example, based on a corresponding calibration. In this way, the fill level measuring device 1 can, in turn, determine the fill level L according to $$d=h-L$$

when the installed height h is furnished in the fill level measuring device 1. For producing the transmitted radar signal $S_{HF}$ and for determining the signal travel time t and the corresponding fill level value L based on the incoming, received signal, the fill level measuring device 1 includes a correspondingly designed transmitting/receiving unit 11, in which, for example, the FMCW—or the pulse travel time, measuring principle is implemented. In the case of the embodiment shown in FIG. 1, and in FIG. 2, the transmitting/receiving unit 11 is arranged in a housing part of the fill level measuring device 1 located in the secured state outside of the container 3. This facilitates the meeting of explosion protection specifications, since then no active, thus electrical current carrying, components are located in the antenna-arrangement 12, thus, within the container 3.

The frequency, and frequency band, at which the signal production unit 11 of the fill level measuring device 1 produces the radar signal $S_{HF}$, is decisively selected as a function of the character of the fill substance 2: For a highly accurate fill level measurement, inherently an as high as possible frequency band is advantageous, since higher frequency bands permit greater bandwidth. In reference to the invention, a high frequency band of 60 Ghz or higher is, moreover, advantageous, since for a given aperture $a_p$, $a_o$, the corresponding radar-bundling means 122 can be compactly dimensioned.

Starting from the antenna arrangement 12, which protrudes orthogonally inwardly from the container wall 31 and, thus, is horizontally oriented, the axis of the main radiation lobe of the radar signal $S_{HF}$ extends perpendicularly to the fill substance 2. As can be seen from comparison of the front view and the side view of the fill level measuring device 1 in FIG. 1, the bundling $b_p$, $b_o$ of the antenna arrangement 12 is, in such case, asymmetric: In parallel with the tube axis A of the antenna arrangement 12, the bundling $b_p$ is about three times as great as the bundling $b_o$ orthogonally to the tube axis. In this way, the main radiation lobe of the radar signal $S_{HF}$ is correspondingly greater focused relative to the container wall 31, whereby the wall does not disturbingly reflect the radar signal $S_{HF}$.

A corresponding aperture $a_p$, $a_o$ within the antenna arrangement 12 compact enough that the antenna arrangement 12 can be used also for the smallest container openings 31 comprises, according to the invention, a primary radiator 123 and a radar-bundling means 122, in whose focus the primary radiator 123 is arranged. In such case, not only the radar-bundling means 122 has a correspondingly asymmetric aperture $a_p$, $a_o$, but, instead, also the primary radiator 123. Additionally, the apertures $a_p$, $a_o$ of the primary radiator 123 and the radar-bundling means 122 have the same ratio of asymmetry. The ratio can be set, for example, at 3:1.

Figure 2:
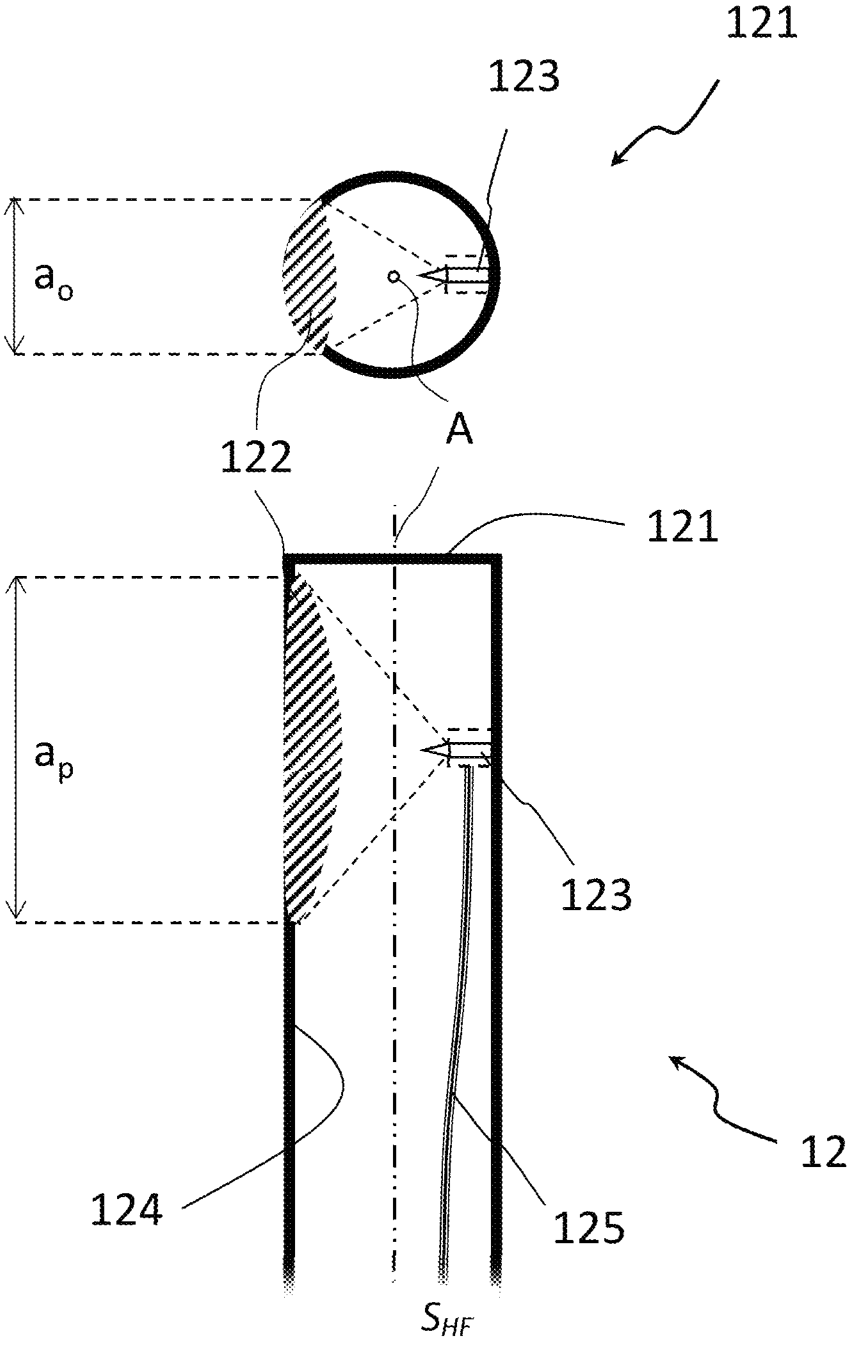
FIG. 2 shows an embodiment of the antenna arrangement of the fill level measuring device of the present disclosure.

An example of an embodiment of the antenna arrangement 12 of the invention is shown in FIG. 2. In accordance therewith, the primary radiator 123 is arranged in the end region 121 of the antenna arrangement 12 in the tube interior 124 on the side located above in the secured state of the antenna arrangement 12. In such case, the main radiation axis of the primary radiator 123 is oriented downwards orthogonally to the tube axis A. The radar-bundling means 122 is arranged centrally in the main radiation axis of the primary radiator 123, thus, with respect to tube axis A, in the tube wall opposite the primary radiator 123. Associated therewith, the bundling device 122 in the secured state of the antenna arrangement 12 is oriented perpendicularly to the fill substance 2. In the case of the embodiment shown in FIG. 2, the radar-bundling means 122 is implemented in the form of a lens, wherein the lens 122 for radar-bundling can, for example, be made of temperature- and media-stable PTFE. For mounting the lens, thus the radar-bundling means 122, the tube has in the lower end region 121 a cutout matching the outer contour of the lens 122. In such case, lens 122 is held pressure- and media-tightly in the cutout, for example, by means of an appropriately stable adhesive. When the desired aperture $a_p$, $a_o$ permits, the lens 122 advantageously does not extend out of the tube, but, instead, is flush with the surface of the tube, such as shown in FIG. 2. In this way, undesired deposits, such as dust or fill substance-residues, on the antenna arrangement 12 are suppressed.

Schematically, FIG. 2 shows, moreover, that the lens 122 and the primary radiator 123 are so adapted relative to one another for beam guiding that the primary radiator 123 completely illuminates the lens 122 with the transmitted radar signal $S_{HF}$. I.e., the radar signal $S_{HF}$ with respect to the main radiation axis of the directional characteristic line of the primary radiator 123 illuminates the outer contour of the lens 122 with −10 dB. In this way, the intensity of the transmitted radar signal $S_{HF}$ is maximized, such that the reflected radar signal can be correspondingly better received at the primary radiator 123. In contrast with the embodiment shown in FIG. 2, in the case of which the primary radiator 123 is implemented as a metal coupling pin, the primary radiator 123 can alternatively also be designed as asymmetrically radiating patch antenna, thus an antenna array, or as a slit-hollow conductor antenna.

As shown in FIG. 2, the transmitting/receiving unit 11 located outside of the container 3 is connected with the primary radiator 123 for high frequency transfer via a waveguide 125, such as, for example, a hollow conductor or a dielectric waveguide, in order to transfer the radar signals $S_{HF}$. In such case, the waveguide 125 couples the radar signal $S_{HF}$ in such a manner into the primary radiator 125 that the radar signal $S_{HF}$ is deflected there by 90°. In order to secure the waveguide 125 mechanically in the antenna arrangement, the tube interior 124 can be filled with a foam material having a low dielectric value, such as Rohazell®. In contrast with the embodiment shown in FIG. 2, the transmitting/receiving unit 11 can be arranged together with the primary radiator 123 in the focal point of the lens 122, thus the bundling device, as a monolithically integrated unit. This offers the advantage of reduced signal losses, but interferes with an explosion resistant design of the fill level measuring device 1.

The variant of the antenna arrangement 12 shown in FIG. 2 has a round tube cross section to match the container opening 31. Of course, the tube of the antenna arrangement 12 can also be designed with any other cross section, such as, for example, a rectangular cross-section. Also, in contrast to the shown view, the tube axis A does not need to be straight, so long as the container opening 31 permits a deviation from being straight. Another option is to provide a moderate, horizontal and/or vertical bending of the tube axis A, for example, up to 30°, in order that the antenna arrangement 12 can, for example, bypass objects installed in the container.

The invention claimed is:

1. A radar based, fill level measuring device for measuring a fill level of a fill substance in a container, comprising:

a securement means by which the fill level measuring device is securable at a lateral opening of the container;

a transmitting and receiving unit designed to;

produce a radar signal and transmit the radar signal toward the fill substance;

receive a reflected radar signal after reflection of the radar signal on a fill substance surface; and determine the fill level based on the received radar signal; and a tubular antenna arrangement having a defined tube axis, wherein the tubular antenna arrangement has a cross-section smaller than the lateral opening of the container, and wherein the tubular antenna arrangement has:

an end region which, in a secured state, protrudes out into the container, a radar-bundling means arranged in the end region and oriented in the secured state perpendicularly to the fill substance, and a primary radiator connected with the transmitting and receiving unit and arranged in an interior of the tubular antenna arrangement in a focal point of the radar-bundling means to transmit the radar signal to the fill substance and to receive its reflection, wherein the radar-bundling means and the primary radiator each has an asymmetric aperture that is larger in parallel with the tube axis than orthogonally to the tube axis and wherein the radar-bundling means and the primary radiator are adapted to one another such that the primary radiator illuminates an outer contour of the radar-bundling means with the radar signal with less than −10 dB.

2. The fill level measuring device as claimed in claim 1, wherein the cross-section of the tubular antenna arrangement is smaller than a container opening with a diameter of maximum DN50.

3. The fill level measuring device as claimed in claim 1, wherein the aperture of the radar-bundling means, and of the primary radiator, is greater parallel to the tube axis by at least a factor of 1.5 than orthogonally to the tube axis.

4. The fill level measuring device as claimed in claim 1, wherein the transmitting and receiving unit is designed to produce the radar signal with a frequency of at least 60 GHz.

5. The fill level measuring device as claimed in claim 1, wherein the primary radiator is designed as a patch antenna, an antenna array, an electrically conductive coupling-pin, or a slit-hollow conductor antenna.

6. The fill level measuring device as claimed in claim 1, wherein the primary radiator is designed as an integral component of the transmitting and receiving unit.

7. The fill level measuring device as claimed in claim 1, wherein the transmitting/receiving unit is arranged in the fill level measuring device such that the transmitting and receiving unit is located in the secured state outside of the container.

8. The fill level measuring device as claimed in claim 7, wherein the primary radiator is connected with the transmitting and receiving unit via a waveguide.

9. The fill level measuring device of claim 8, wherein the waveguide is a hollow conductor, a dielectric waveguide, a microstrip conductor, or a coaxial cable.

10. The fill level measuring device as claimed in claim 1, wherein the radar-bundling means is lens-shaped and/or made of PE, PEEK or PTFE.

* * * * *